(12) United States Patent
Matsuoka et al.

(10) Patent No.: US 6,654,199 B1
(45) Date of Patent: Nov. 25, 2003

(54) RECORDING/REPRODUCING APPARATUS WITH REDUCED NUMBER OF GUIDE POSTS

(75) Inventors: Hidetoshi Matsuoka, Tokyo (JP); Katsuyuki Tsukui, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 98 days.

(21) Appl. No.: 09/704,750

(22) Filed: Nov. 3, 2000

(30) Foreign Application Priority Data

| Nov. 8, 1999 | (JP) | 11-316470 |
|---|---|---|
| Jan. 26, 2000 | (JP) | 2000-017067 |
| May 22, 2000 | (JP) | 2000-149983 |

(51) Int. Cl.⁷ .............................................. G11B 5/027
(52) U.S. Cl. .................................................... 360/85
(58) Field of Search ............................ 360/85, 132, 95, 360/99.02, 99.06, 92, 84, 130; 242/19; G11B 5/27, 23/02, 5/08, 15/00, 17/00, 15/60, 15/665

(56) References Cited

U.S. PATENT DOCUMENTS

| 4,556,922 A | * | 12/1985 | Erhart ........................ 360/85 |
|---|---|---|---|
| 4,561,029 A | * | 12/1985 | Maeda ........................ 360/85 |
| 4,672,479 A | * | 6/1987 | Takao et al. ................ 360/95 |
| 4,692,824 A | * | 9/1987 | Takahara et al. ............ 360/85 |
| 4,803,574 A | * | 2/1989 | Konishi et al. ............. 360/85 |
| 4,807,077 A | | 2/1989 | Zaitsu et al. |
| 5,305,162 A | | 4/1994 | Kushiro et al. |
| 5,316,234 A | * | 5/1994 | Honsho et al. ............. 360/132 |
| 5,363,256 A | * | 11/1994 | Kobayashi ................... 360/85 |
| 5,395,064 A | * | 3/1995 | Honsho et al. ............. 360/132 |
| 5,418,662 A | * | 5/1995 | Kimura ....................... 360/71 |
| 5,475,546 A | * | 12/1995 | Choi .......................... 360/85 |
| 5,546,249 A | * | 8/1996 | Konishi et al. ............. 360/95 |
| 5,608,589 A | * | 3/1997 | Kang et al. ................. 360/85 |
| 5,659,439 A | * | 8/1997 | Matsuoka .................... 360/85 |
| 5,699,208 A | * | 12/1997 | Kim et al. ................... 360/85 |
| 5,781,366 A | * | 7/1998 | Matsuoka .................... 360/85 |
| 5,963,394 A | * | 10/1999 | Yamabuchi et al. ......... 360/85 |

FOREIGN PATENT DOCUMENTS

| JP | 04-229442 | * | 8/1992 | ......... G11B/15/665 |
|---|---|---|---|---|
| JP | 5-6600 | | 1/1993 | |
| JP | 7-56472 | | 6/1995 | |

* cited by examiner

*Primary Examiner*—William Korzuch
*Assistant Examiner*—Christopher R Beacham
(74) *Attorney, Agent, or Firm*—Fitzpatrick, Cella, Harper & Scinto

(57) ABSTRACT

A recording and reproducing apparatus includes a guide post for pulling out a tape-shaped recording medium from a cassette and wrapping the tape-shaped recording medium around a rotary drum, a guide base which supports the guide post, the guide base being movable between a first position in which the cassette can be loaded and a second position in which a recording or reproducing action can be performed with the tape-shaped recording medium wrapped around the rotary drum at a predetermined angle, and an elastic member for, after the guide base moves from the first position to the second position, urging the guide base toward the second position to position the guide base at the second position. The elastic member is disposed on an upper surface of the guide base.

6 Claims, 7 Drawing Sheets

RECORDING/REPRODUCING APPARATUS WITH REDUCED NUMBER OF GUIDE POSTS

BACKGROUND OF THE INVENTION

1. Field of the Invention

The present invention relates to a recording and reproducing apparatus, and more particularly to a recording and reproducing apparatus arranged to perform a recording or reproducing action by pulling out a tape-shaped recording medium from a cassette and wrapping the tape-shaped recording medium around a rotary drum.

2. Description of Related Art

Each of conventional recording and reproducing apparatuses, such as a video tape recorder (VTR) and a digital audio tape recorder (DAT), is provided with a tape loading apparatus, which is arranged to, in loading a tape cassette, pull out a magnetic tape from the tape cassette and to wrap the magnetic tape around the peripheral circumferential surface of a rotary drum over a predetermined angular range.

The tape loading apparatus is provided with guide posts for pulling the tape out from the tape cassette when the tape cassette is loaded, guide-post moving members (hereinafter referred to as the guide post bases) on which the guide posts are mounted, and cam grooves which guide the guide post bases along the circumferential surface of the rotary drum.

When the recording and reproducing apparatus is loaded with the tape cassette, the guide posts serving to pull out the tape wrap the tape around the peripheral circumferential surface of the rotary drum while pulling out the tape from the tape cassette in conjunction with the guide post bases, and are then positioned and press-fixed at their loading completion positions, thereby forming a tape travel path including the circumferential surface of the rotary drum.

In the recording and reproducing apparatus of the kind having such a tape loading apparatus, for the purpose of attaining a reduction in size, two chassis, whose relative positions differ at the time of loading of the tape cassette and at the time of recording or reproduction, are used, and the angle of wrapping of the tape around the circumferential surface of the rotary drum is increased by reducing the diameter of the rotary drum.

For example, as disclosed in Japanese Patent Publication No. Hei 7-56742, Japanese Laid-Open Patent Application No. Hei 5-6600, etc., the reduction in size of a recording and reproducing apparatus is attained by cutting out a mouth part of the tape cassette to enlarge a space for accommodating a rotary drum. This method for reduction in size, however, causes an increase in the number of posts to be used, producing a disadvantage in terms of cost, and also lessens the length of recordable time on the tape.

In addition, according to the conventional method for reduction in size, although the size of the rotary drum is decreased to provide additional space, the presence of tape guide members in the space hinders the effective use of the space.

Further, if the guide post bases fail to be correctly positioned with respect to the rotary drum at the tape loading completion positions, the tape wrapping angle and the tape wrapping start and end positions, which determine a signal recording track position on the magnetic tape, cannot be accurately set. Then, in reproducing a signal from the magnetic tape, track deviations arise to make it hardly possible to retain adequate interchangeability and to retain an adequate rate of positional accuracy with repeated tape loading operations. It is, therefore, necessary to provide a positioning mechanism for stably positioning the guide post bases to ensure no rattling.

The guide post bases may be stably positioned without rattling, by using an elastic positioning means. In order to have adequate positioning accuracy, however, the elastic positioning means must have a strong elastic force. To meet this requirement, an elastic member to be used for this purpose must be arranged to have a large number of turns. However, this arrangement using such an elastic member requires a larger space.

BRIEF SUMMARY OF THE INVENTION

Under such a background, the invention is directed to the solution of the problems of the prior art described above. It is, therefore, an object of the invention to provide a recording and reproducing apparatus arranged to permit a reduction in size thereof by minimizing a necessary number of the guide posts and by effectively arranging the guide posts at spaces other than spaces occupied by a rotary drum and a tape cassette in a recording or reproducing state, while retaining the predetermined angle of wrapping of a tape around the rotary drum.

It is another object of the invention to provide a highly-reliable recording and reproducing apparatus which is arranged to have an elastic member allocated and arranged in an improved manner to have guide post bases stably positioned with no rattling.

To attain the above objects, in accordance with an aspect of the invention, there is provided a recording and reproducing apparatus, which comprises a guide post for pulling out a tape-shaped recording medium from a cassette and wrapping the tape-shaped recording medium around a rotary drum, a guide base which supports the guide post, the guide base being movable between a first position in which the cassette can be loaded and a second position in which a recording or reproducing action can be performed with the tape-shaped recording medium wrapped around the rotary drum at a predetermined angle, and an elastic member for, after the guide base moves from the first position to the second position, urging the guide base toward the second position to position the guide base at the second position, wherein the elastic member is disposed on an upper surface of the guide base.

The above and other objects and features of the invention will become apparent from the following detailed description of a preferred embodiment thereof taken in connection with the accompanying drawings.

DETAILED DESCRIPTION OF THE INVENTION

Hereinafter, a preferred embodiment of the invention will be described in detail with reference to the drawings.

Figure 1:
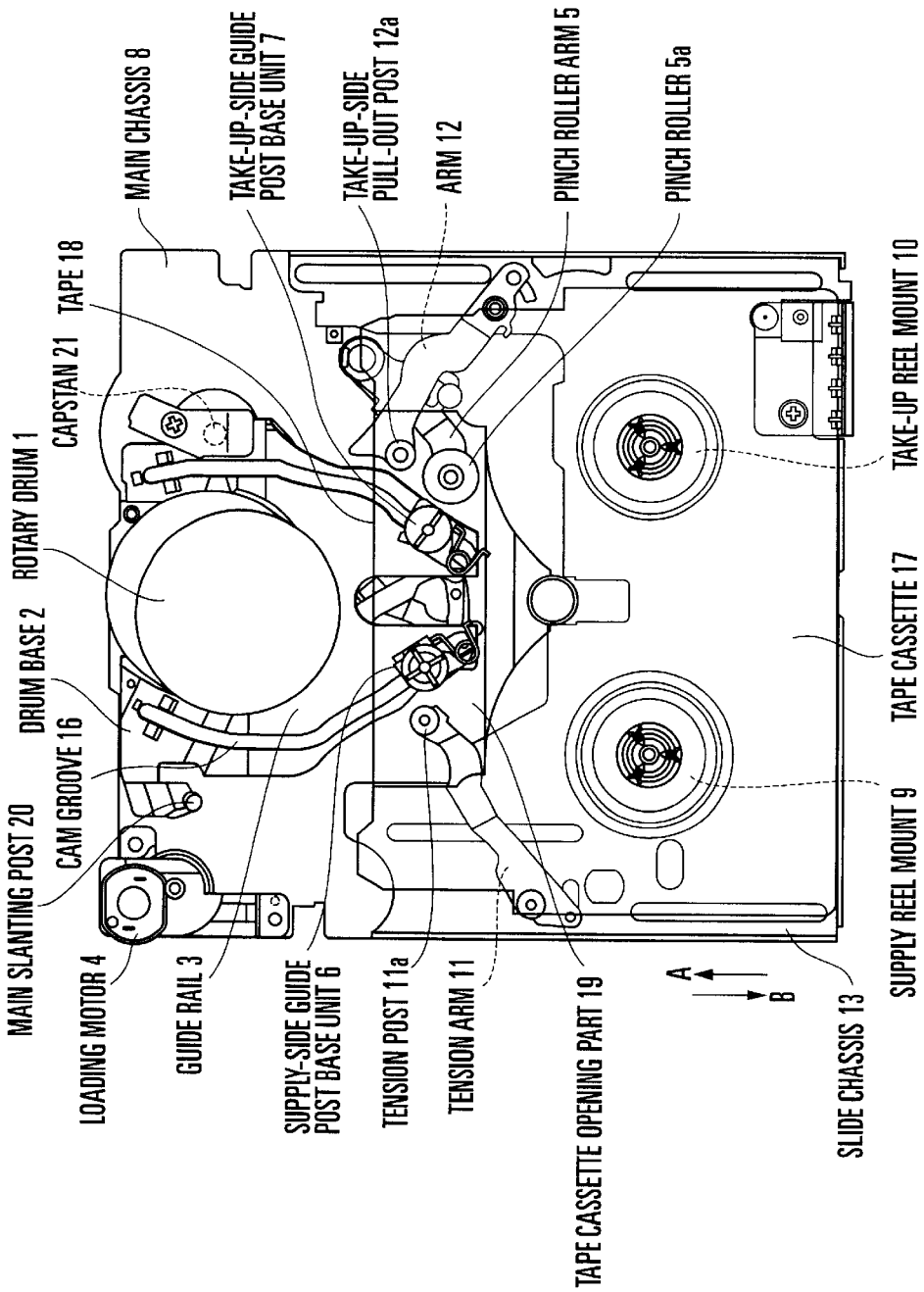
FIG. 1 is a plan view showing a tape loading apparatus, serving as a recording and reproducing apparatus according to an embodiment of the invention, in a loading standby state.
Figure 2:
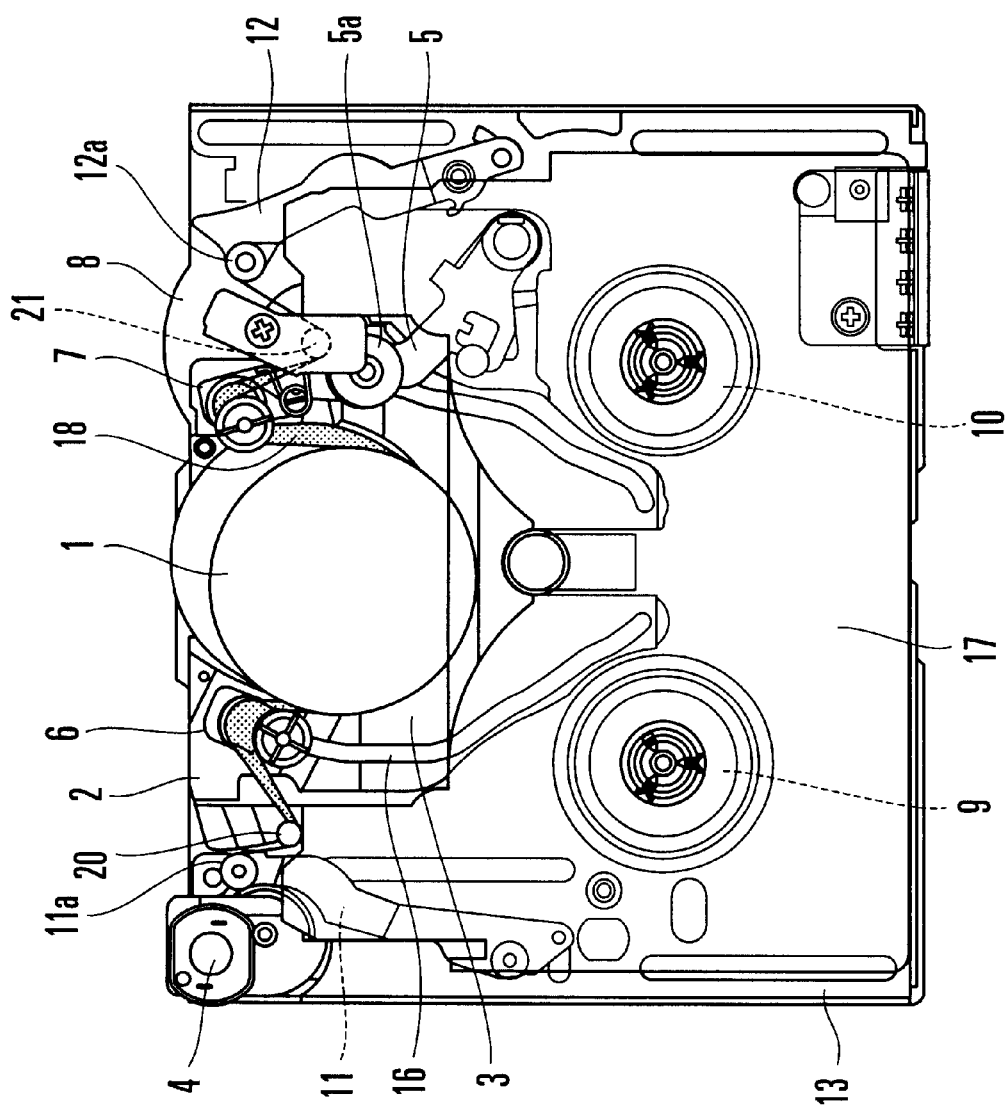
FIG. 2 is a plan view showing the tape loading apparatus, according to the embodiment, in a loading completion state.

FIG. 1 is a plan view showing a tape loading apparatus, serving as a recording and reproducing apparatus according to the embodiment of the invention, in a loading standby state. FIG. 2 is a plan view showing the tape loading apparatus, according to the embodiment, in a loading completion state. First, the basic structural arrangement and the operation of the tape loading apparatus according to the embodiment are described below with reference to FIGS. 1 and 2.

Referring to FIGS. 1 and 2, a rotary drum 1 has magnetic heads (not shown) mounted thereon. A drum base 2 is arranged to support the rotary drum 1. A guide rail 3 has cam grooves 16 formed therein. A loading motor 4 is arranged to serve as a drive source of a tape loading mechanism. A pinch roller 5a is arranged to be pressed against a capstan 21 across a tape, so as to transport the tape. A pinch roller arm 5 is arranged to swing the pinch roller 5a. A supply-side guide post base unit 6 is provided with a supply-side guide post 61 (shown in FIG. 3) arranged to determine a slanting angle at which the tape is wrapped around the rotary drum 1 on the side of a supply reel (hereinafter referred to as a supply side). A take-up-side guide post base unit 7 is provided with a take-up-side guide post arranged to determine a slanting angle at which the tape is wrapped around the rotary drum 1 on the side of a take-up reel (hereinafter referred to as a take-up side). The tape loading apparatus further includes a main chassis 8, a supply reel mount 9 and a take-up reel mount 10. A tension post 11a is arranged to pull the tape out from a tape cassette and to impart a suitable amount of tension to the tape. A tension arm 11 is arranged to swing the tension post 11a. A take-up-side pull-out post 12a is arranged to pull the tape out from the cassette on the take-up side. An arm 12 is arranged to swing the take-up-side pull-out post 12a. A slide chassis 13 is arranged to be slidable. The cam grooves 16 are formed in the guide rail 3 to guide the guide post base units 6 and 7. Reference numeral 17 denotes the tape cassette, and reference numeral 18 denotes the tape. A cassette opening part 19 is formed in the front surface of the tape cassette 17. The tape loading apparatus further includes a main slanting post 20 and a capstan 21, which is disposed on the main chassis 8 to be rotatable for transporting the tape 18.

The drum base 2, the guide rail 3, the loading motor 4, the pinch roller arm 5, the supply-side guide post base unit 6, the take-up-side guide base post unit 7, etc., are disposed on the main chassis 8. The supply reel mount 9, the take-up reel mount 10, the tension arm 11, the arm 12, etc., are disposed on the slide chassis 13.

The slide chassis 13 is supported on the main chassis 8 to be slidable in the directions of arrows A and B shown in FIG. 1. When a tape loading action is performed, the slide chassis 13 moves the tape cassette 17 to the rotary drum 1 to have a part of the rotary drum 1 inserted into the opening part 19 of the tape cassette 17.

As apparent from FIGS. 1 and 2, when the tape loading action begins with the tape cassette 17 placed on the slide chassis 13 in the tape unloading state shown in FIG. 1, the supply-side and take-up-side guide post base units 6 and 7 move along the cam grooves 16, and the slide chassis 13 moves toward the rotary drum 1. In a loading completion state obtained with the slide chassis 13 moved to the rotary drum 1, the tape 18 is wrapped around the circumferential surface of the rotary drum 1 with a part of the rotary drum 1 inserted into the opening part 19 of the tape cassette 17.

Figure 3:
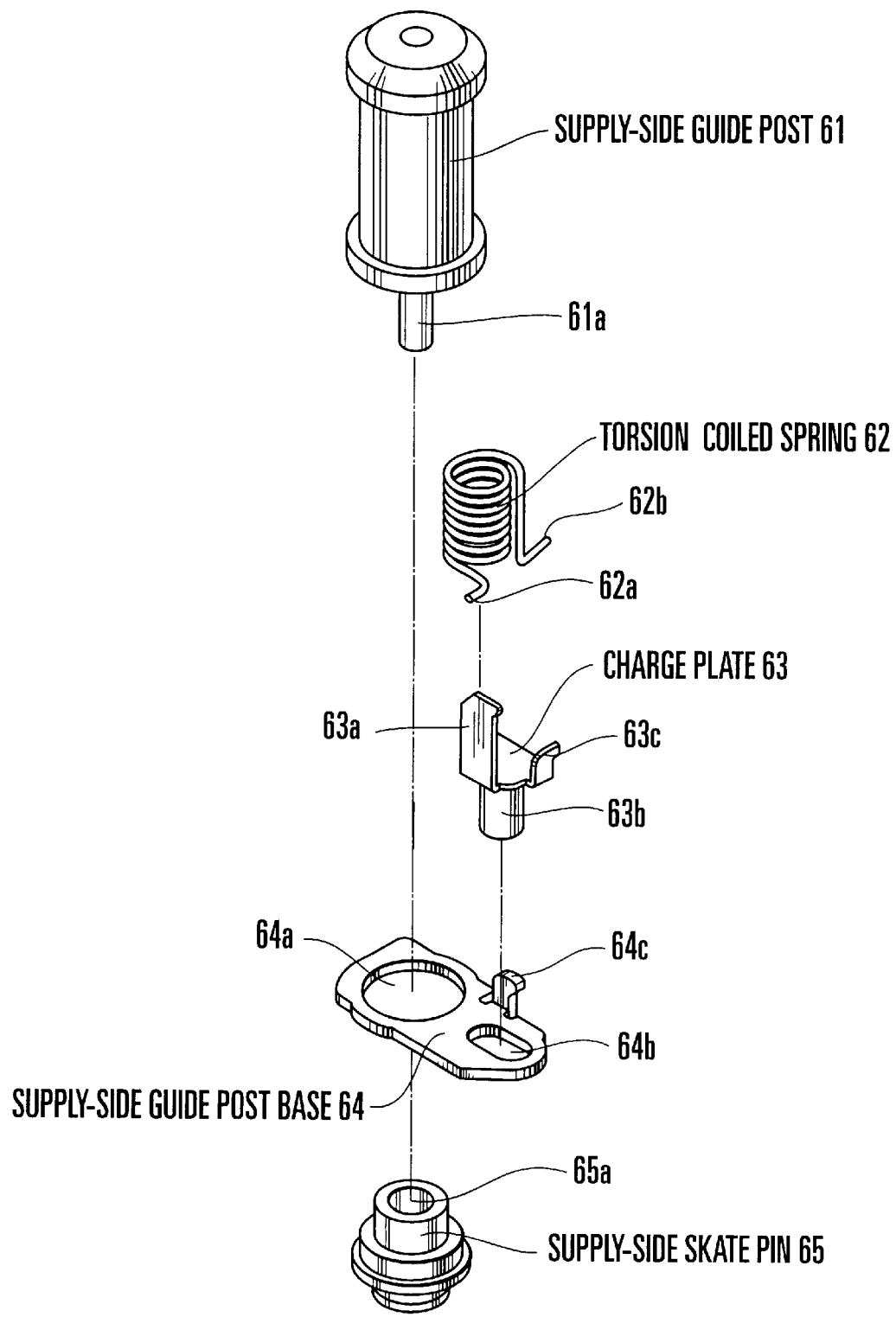
FIG. 3 is an exploded perspective view showing a supply-side guide post base unit shown in FIG. 1.

FIG. 3 is an exploded perspective view showing the supply-side guide post base unit 6. The supply-side guide post base unit 6 is composed of a supply-side guide post 61, a torsion coiled spring 62, a charge plate 63, a supply-side guide post base 64 and a supply-side skate pin 65.

The shaft 61a of the supply-side guide post 61 is press-fitted into a hole part 65a of the supply-side skate pin 65 through a hole part 64a of the supply-side guide post base 64. The torsion coiled spring 62 is supported by a spring fixing part 63a of the charge plate 63. The shaft 63b of the charge plate 63 is inserted into a slot 64b formed in the supply-side guide post base 64.

The torsion coiled spring 62 has arm parts 62a and 62b which are hooked respectively on a spring hook part 63c of the charge plate 63 and a spring hook part 64c of the supply-side guide post base 64. With the torsion coiled spring 62 arranged in the above manner, the charge plate shaft 63b, which is inserted in the slot 64b of the supply-side guide post base 64, is urged toward an end part of the slot 64b located opposite to another end part located closer to the hole part 64a. The supply-side guide post base unit 6 is thus arranged in the above manner. The take-up-side guide post base unit 7 is also arranged in about the same manner as the arrangement of the supply-side guide post base unit 6. Therefore, the description of the take-up-side guide post base unit 7 is omitted to avoid duplication.

Figure 4:
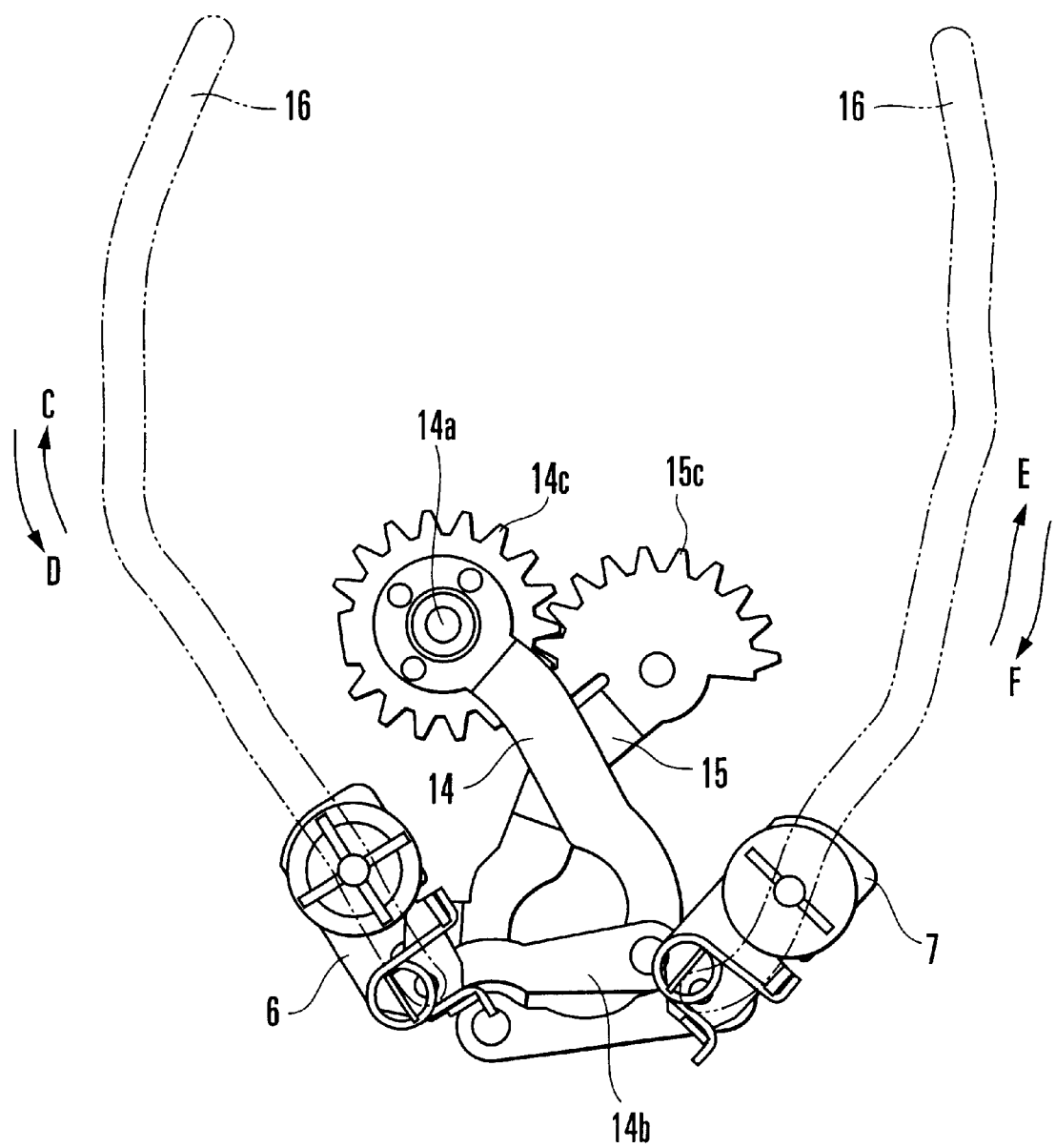
FIG. 4 is a diagram showing essential parts of the tape loading apparatus, according to the embodiment, in the loading standby state.
Figure 5:
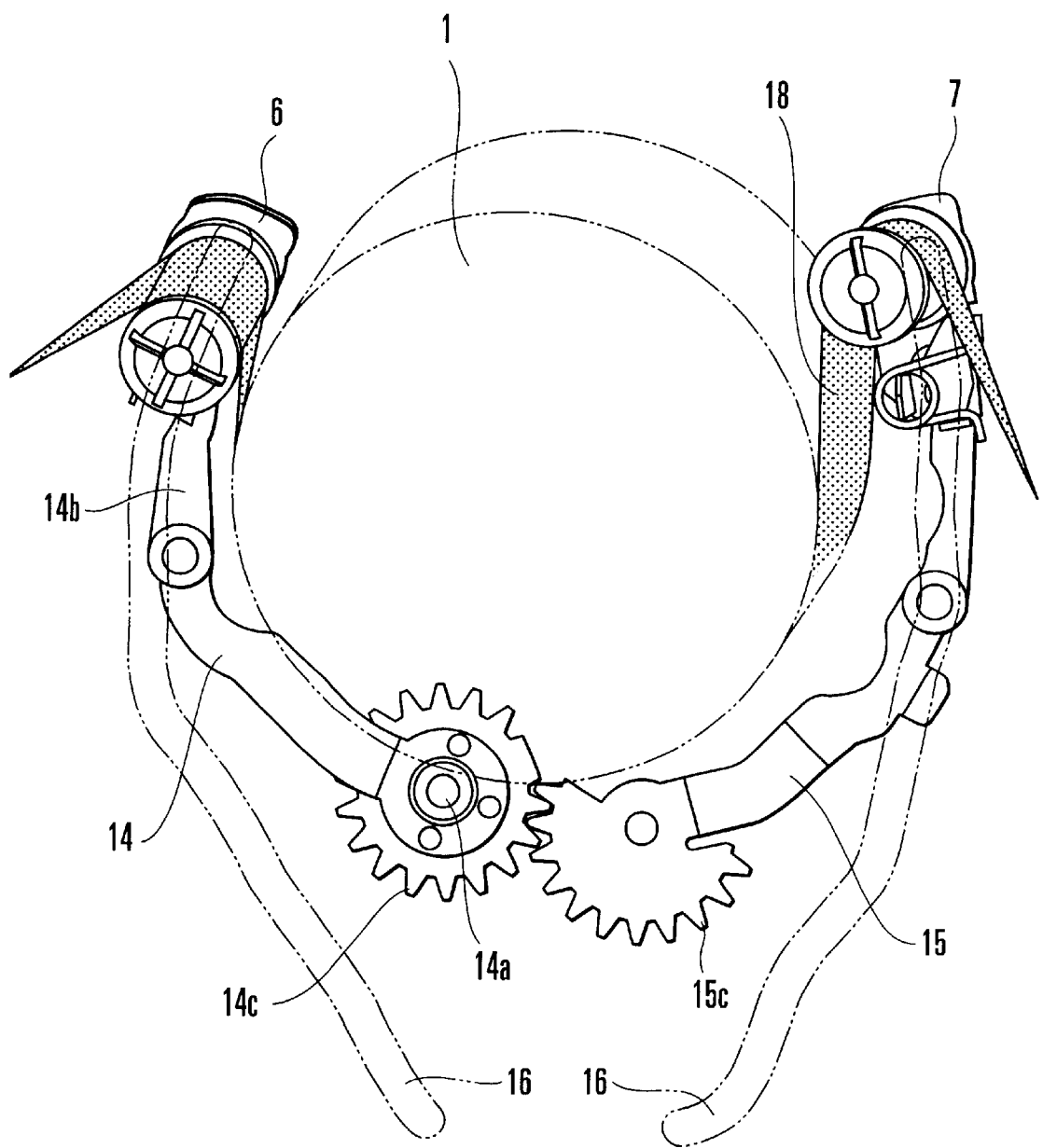
FIG. 5 is a diagram showing essential parts of the tape loading apparatus, according to the embodiment, in the loading completion state.
Figure 6A:
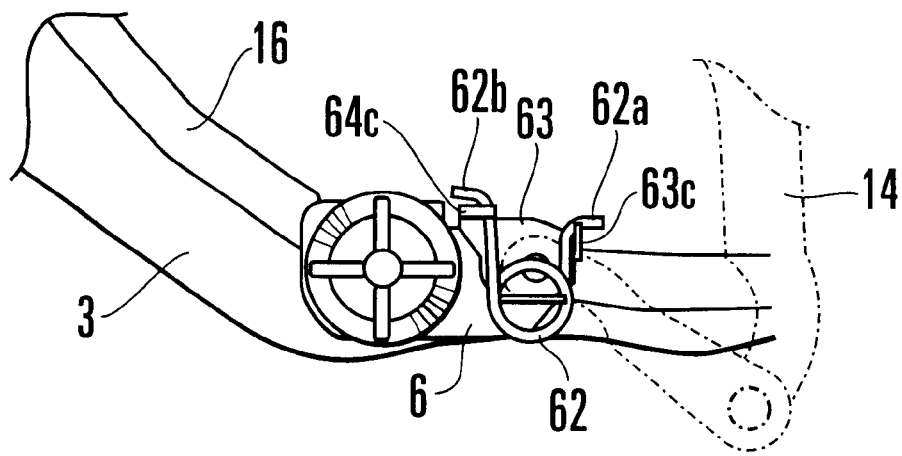
FIGS. 6(a) and 6(b) are a plan view and a side view, respectively, showing the supply-side guide post base unit during the process of moving from the loading standby state to the loading completion state.
Figure 6B:
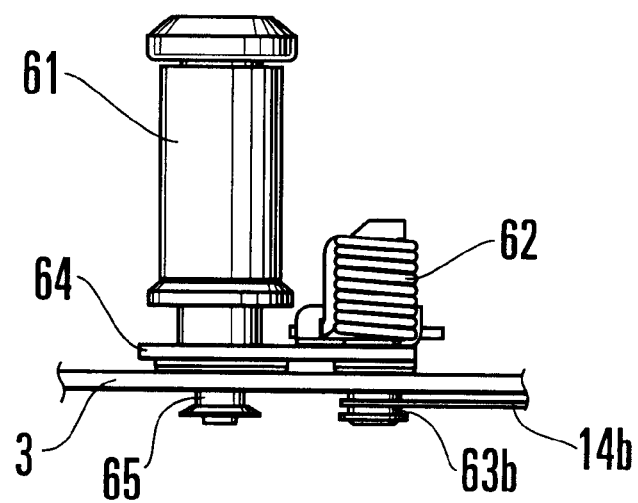

FIG. 4 is a diagram showing essential parts of the tape loading apparatus, according to the embodiment, in the loading standby state. FIG. 5 is a diagram showing essential parts of the tape loading apparatus, according to the embodiment, in the loading completion state. Further, FIGS. 6(a) and 6(b) are a plan view and a side view, respectively, showing the supply-side guide post base unit 6 during the process of moving from the loading standby state to the loading completion state.

Referring to FIG. 4, FIG. 5 and FIGS. 6(a) and 6(b), a supply-side loading arm 14, which drives the supply-side guide post base unit 6, is supported by the drum base 2 in such a way as to be rotatable around a fulcrum 14a. An arm part 14b of the supply-side loading arm 14 is connected to the charge plate shaft 63b of the supply-side guide post base unit 6.

Further, with the supply-side skate pin 65 of the supply-side guide post base unit 6 inserted in the cam groove 16 provided in drum base 2 and the guide rail 3, the supply-side guide post base unit 6 is guided to slide in the directions of arrows C and D shown in FIG. 4 according to the swinging motion of the supply-side loading arm 14. Similarly, the take-up-side guide post base unit 7 is also arranged to be guided to slide in the directions of arrows E and F shown in FIG. 4 along the other-side cam groove 16 according to the swinging motion of the take-up-side loading arm 15.

With the tape loading apparatus arranged in the manner as described above, at the beginning of loading the tape cassette 17, the supply-side guide post base unit 6, the take-up-side guide post base unit 7, the tension post 11a, the pinch roller 5a and the take-up-side pull-out post 12a are located in the loading standby position, which is encompassed with the tape cassette opening part 19 and the tape 18.

When the tape cassette 17 is loaded, the loading motor 4 starts to rotate. The rotation of the loading motor 4 is transmitted by transmission gears (not shown) to cause the supply-side loading arm 14 to swing. Further, since a gear part 14c of the supply-side loading arm 14 is in mesh with a gear part 15c of the take-upside loading arm 15, the take-up-side loading arm 15 also swings. According to the swinging motion of the supply-side loading arm 14 and that of the take-up-side loading arm 15, the supply-side guide post base unit 6 and the take-up-side guide post base unit 7 are guided to slide along the cam grooves 16 respectively in the directions of arrows C and E shown in FIG. 4, thereby wrapping the tape 18 around the peripheral circumferential surface of the rotary drum 1 over a predetermined range of angle.

Further, the slide chassis 13 shown in FIG. 1 also moves in the direction of an arrow A. Then, the tension arm 11, the pinch roller arm 5 and the arm 12 also swing to form a tape travel path in a predetermined shape in the loading completion state. In the loading completion state shown in FIG. 2, the tape 18 is allowed to travel for recording or reproduction.

In the tape loading completion state shown in FIGS. 2 and 5, the supply-side guide post base unit 6 and the take-up-side guide post base unit 7 are respectively caused to abut on positioning parts (not shown) provided at end portions of the cam grooves 16 and to be locked thereby. In this instance, in each of the guide post base units 6 and 7, a part of the guide post base 64 or the skate pin 65 abuts on the positioning part (not shown) provided at the end portion of the cam groove 16 in such a way as to accurately determine the position and angle of the guide post 61.

Then, since such an overstroke of the arm part 14b is set that the supply-side loading arm 14 swings further in the tape loading direction from the above-mentioned state and the arm part 14b presses the charge plate 63, the shaft 63b of the charge plate 63 moves inside the slot 64b of the guide post base 64 against the urging force of the torsion coiled spring 62 in such a way as to absorb the overstroke of the arm part 14b and to cause the torsion coiled spring 62 to be charged by the spring hooking part 63c of the charge plate 63 and the spring hooking part 64c of the supply-side guide pose base 64. By the charging force of the torsion coiled spring 62 thus obtained, the supply-side guide post base unit 6 is adequately press-set and positioned at the loading completion position.

Incidentally, the take-up-side guide post base unit 7 is also press-set and positioned in about the same manner as the positioning action on the supply-side guide post base unit 6 described above, and, therefore, the positioning action on the take-up-side guide post base unit 7 is omitted from the description here.

Figure 7:
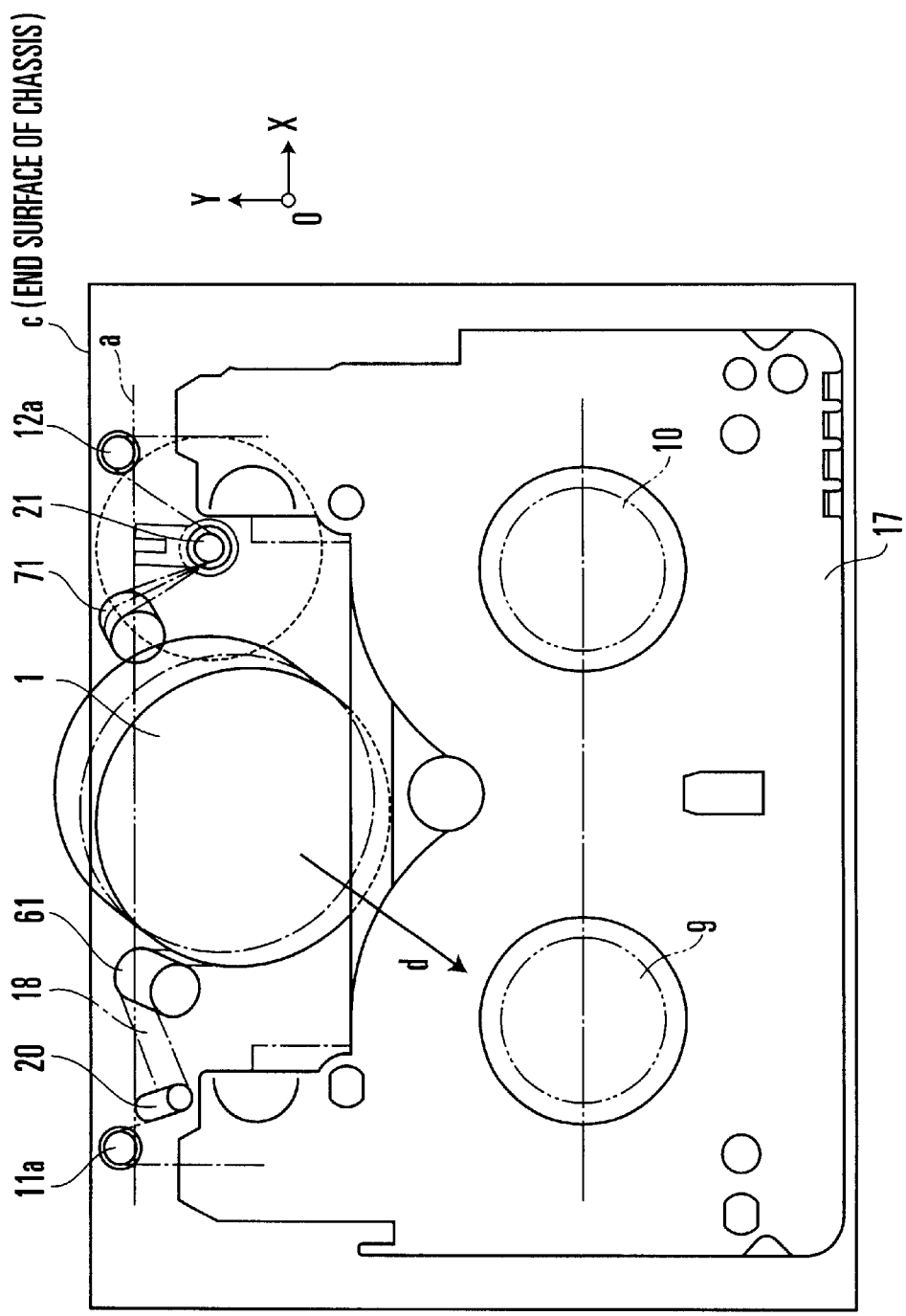
FIG. 7 is a plan view showing a tape path formed according to the embodiment.

FIG. 7 shows a tape path formed in the tape loading completion state. The tape pull-out posts (the tension post 11a, the supply-side guide post 61, the take-up-side guide post 71 and the take-up-side pull-out post 12a), which have been located inside the mouth of the tape cassette 17 at the time of beginning of loading the tape cassette 17, are caused by the tape loading action to pull the tape out from the tape cassette 17 and to wrap the tape around the rotary drum 1, thereby forming a tape path shown in FIG. 7 at the time of completion of the tape loading action. In such a loading completion state, in which recording or reproduction is possible, the other pull-out posts 11a and 12a are located on a line "a" connecting the center of a lower flange of the supply-side guide post 61 to the center of an upper flange of the take-up-side guide post 71. Further, the line "a" is approximately parallel with a straight line connecting the center of the supply reel mount 9 to the center of the take-up reel mount 10, and is located between the center of the rotary drum 1 and an end surface "c" of the main chassis 8.

In this instance, assuming that an X-Y rectangular coordinate system having the line "a" on the X axis and positive values on its right side is adopted, the rotary drum 1 is slanting in the direction of the third quadrant of the X-Y rectangular coordinate system. Further, the angle of inclination of the rotary drum 1 is arranged to be a little less than a value which is two times as much as an angle of lead.

With the tape path obtained in the above manner, the tape loading mechanism according to the embodiment is arranged to permit a reduction in size of the apparatus in a top-and-bottom direction as viewed on the drawing paper of FIG. 7, i.e., in the direction of depth of the apparatus.

As shown in FIG. 7, the rotary drum 1 is made to be accommodated inside the mouth of the tape cassette 17 by sliding, relative to the rotary drum 1, the slide chassis 13 on which the tape cassette 17 is placed, so that the size in the direction of depth of the apparatus is reduced.

Further, the depth of the main chassis 8 is shortened to such an extent that the rear end of the rotary drum 1 is located slightly outside the rear end of the main chassis 8. As a result, the guide posts 61 and 71, the tension post 11a and the take-up-side pull-out post 12a are made to be aligned on the straight line "a" in the neighborhood of the rear end of the rotary drum 1, as shown in FIG. 7. Therefore, the space factor of the apparatus is greatly improved.

Also, in the tape path described above, the rotary drum 1 is arranged to slant to a predetermined degree in the direction of an arrow "d" shown in FIG. 7. With the rotary drum 1 arranged in this slanting posture, the guide post 61 of the supply-side guide post base unit 6 can be set at the same degree of inclination as that of the guide post 71 of the take-up-side guide post base unit 7.

This arrangement permits the use of identical parts for the left and right guide post base units (guide posts), and thus permits a reduction in cost of production to a great extent.

Further, in the tape path described above, the angle of wrapping of the tape around each of the tension post 11a, the main slanting post 20, the guide post 61, the guide post 71, the capstan 21 and the take-up-side pull-out post 12a is set to more than about 110°, for example, in the embodiment.

This angle of wrapping is sufficient for stably transporting the tape, so that the tape transport system in the embodiment can be stably and accurately operated.

As has been described above, according to the embodiment, as shown in FIG. 6(b), the torsion coiled spring 62, which is spirally twisted in the direction of height of the supply-side guide post 61, is disposed on the upper surface of the supply-side guide post base 64. That arrangement permits an increase in the number of turns of the torsion coiled spring 62, thereby lessening the fluctuation of pressing force, so that the supply-side guide post base 64 can be stably and accurately positioned.

Further, the embodiment is arranged to permit a reduction in size and thickness of the apparatus with a mechanism arranged to bring the rotary drum 1 into the tape cassette opening part 19 by sliding the tape cassette 17 by means of the slide chassis 13 after loading the tape cassette 17. Even in such a case, the supply-side guide post base unit 6 and the take-up-side guide post base unit 7 always move to a relatively large space encompassed with the tape 18 and the tape cassette opening part 19. Each of the guide post base units 6 and 7 is, therefore, set in a space existing on one side of the guide post opposite to the tape contacting side of the guidepost. The guide post base units 6 and 7 thus never become cumbersome to the tape travel path and other members. Accordingly, it becomes possible to provide a highly-reliable recording and reproducing apparatus capable of stably and accurately positioning the supply-side guide post base unit 6 and the take-up-side guide post base unit 7 while retaining the reduction in size and thickness of the apparatus.

Further, the embodiment is arranged to permit a reduction in size of the apparatus by effectively utilizing spaces other than the spaces occupied by the rotary drum and the tape cassette, and to minimize the number of guide posts, for reduction in cost. Further, the embodiment ensures that the angle of wrapping of the tape around each of the posts is set to not less than 100° (e.g., 110° in the above embodiment), it becomes possible to form a tape path arranged to prevent the tape from being damaged during traveling even when the tape is relatively thin.

Further, the supply-side guide base and the take-up-side guide base are arranged to be made from identical parts. This arrangement permits a reduction in cost by mass production, and also simplifies the management of parts.

As has been described in the foregoing, according to the invention, in a recording and reproducing apparatus, a torsion coiled spring is employed as an elastic member for positioning the guide post base with the urging force thereof. The torsion coiled spring is set at a space encompassed with the opening part of the tape cassette and the tape wrapped around the guide post at the loading completion position. This allocation of the torsion coiled spring permits an increase in number of turns of the torsion coiled spring, so that it is possible to provide a highly-reliable recording and reproducing apparatus while retaining the reduction in size and thickness of the apparatus.

Further, according to the invention, spaces other than the spaces occupied by the rotary drum and the tape cassette are effectively utilized to reduce the size of the apparatus, and the number of guide posts is minimized for reduction in cost. Further, since the angle of wrapping of the tape around each of the posts is set to not less than 100°, it becomes possible to form a tape path arranged to prevent the tape from being damaged during traveling even when the tape is relatively thin.

What is claimed is:

1. A recording and reproducing apparatus, comprising:
   a guide post for pulling out a tape-shaped recording medium from a cassette and wrapping the recording medium around a rotary drum;
   a guide base, which supports said guide post, said guide base being movable between a first position, in which the cassette can be loaded into said apparatus, and a second position, in which a recording or reproducing action can be performed with the recording medium being wrapped around the rotary drum at a predetermined angle;
   an elastic member; and
   a supporting member, which supports said elastic member on an upper surface of said guide base and causes said elastic member to generate an urging force for biasing said guide base toward the second position after said guide base moves from the first position to the second position.

2. The recording and reproducing apparatus according to claim 1, wherein said elastic member is disposed in a space encompassed with the recording medium being wrapped around said guide post and an opening part of the cassette being formed on a side thereof facing the rotary drum in the second position.

3. The recording and reproducing apparatus according to claim 1, wherein said elastic member is disposed on a side of said guide base opposing a surface of said guide post on which the recording medium is wrapped thereon when said guide base is in the second position.

4. The recording and reproducing apparatus according to claim 1, wherein said elastic member is a torsion coiled spring spirally twisted in a direction of a height of said guide post.

5. A recording and reproducing apparatus comprising:
   a plurality of posts for pulling out a tape-shaped recording medium from a cassette, said plurality of posts including a supply-side guide post and a take up-side guide post for pulling out the recording medium from the cassette and wrapping the recording medium around a rotary drum and a tension control post, which controls a tension of the recording medium; and
   a loading mechanism, which causes the recording medium to be wrapped around the rotary drum by moving said supply-side guide post and said take-up-side guide post from a first position, in which the cassette can be loaded, to a second position, in which a recording or reproducing action can be performed;
   a chassis; and
   a pair of reels for transporting the recording medium, said pair of reels being disposed respectively on a supply side and a take-up side of the cassette,
   wherein, when said supply-side guide post, and said take-up-side guide post are in the second position, said supply-side guide post, said take-up-side guide post, and said tension control post are substantially located on a line connecting a center of said supply-side guide post to a center of said take-up-side guide post, and
   wherein the line connecting the center of said supply-side guide post and the center of said take-up-side guide post is approximately parallel with a line connecting a center of the reel on the supply side to a center of the reel on the take-up side, and the line connecting the center of said supply-side guide post and the center of said take-up-side guide post is located between a center of the rotary drum and an end surface of said chassis.

6. A recording and reproducing apparatus comprising:
   a plurality of posts for pulling out a tape-shaped recording medium from a cassette, said plurality of posts including a supply-side guide post and a take up-side guide post for pulling out the recording medium from the cassette and wrapping the recording medium around a rotary drum and a tension control post, which controls a tension of the recording medium; and
   a loading mechanism, which causes the recording medium to be wrapped around the rotary drum by moving said supply-side guide post and said take-up-side guide post from a first position, in which the cassette can be loaded, to a second position, in which a recording or reproducing action can be performed,
   wherein, when said supply-side guide post and said take-up-side guide post are in the second position, said supply-side guide post, said take-up-side guide post, and said tension control post are substantially located on a line connecting a center of said supply-side guide post to a center of said take-up-side guide post and,
   wherein an angle of wrapping of the recording medium around each of said plurality of posts is set to not less than 100°.

* * * * *

UNITED STATES PATENT AND TRADEMARK OFFICE
CERTIFICATE OF CORRECTION

PATENT NO.    : 6,654,199 B1
DATED         : November 25, 2003
INVENTOR(S)   : Hidetoshi Matsuoka et al.

It is certified that error appears in the above-identified patent and that said Letters Patent is hereby corrected as shown below:

Column 5,
Line 6, "take-upside" should read -- take-up-side --.
Line 42, "pose" should read -- post --.

Column 8,
Line 19, "medium; and" should read -- medium; --.
Line 30, "post, and" should read -- post and --.
Line 62, "and," should read -- , and --.

Signed and Sealed this

Twenty-ninth Day of June, 2004

JON W. DUDAS
*Acting Director of the United States Patent and Trademark Office*